United States Patent
Wang

(10) Patent No.: US 10,458,609 B2
(45) Date of Patent: Oct. 29, 2019

(54) MULTILAYER FLASHING WATER BALL APPARATUS

(71) Applicant: Hua-Cheng Pan, Tainan (TW)

(72) Inventor: Chih-Liang Wang, Tainan (TW)

(73) Assignee: Hua-Cheng Pan, Tainan (TW)

(*) Notice: Subject to any disclaimer, the term of this patent is extended or adjusted under 35 U.S.C. 154(b) by 0 days.

(21) Appl. No.: 15/892,414

(22) Filed: Feb. 9, 2018

(65) Prior Publication Data
US 2019/0249838 A1 Aug. 15, 2019

(51) Int. Cl.
| | |
|---|---|
| *F21S 10/06* | (2006.01) |
| *F21V 8/00* | (2006.01) |
| *F21V 23/04* | (2006.01) |
| *F21S 10/00* | (2006.01) |
| *F21W 121/00* | (2006.01) |
| *F21Y 115/10* | (2016.01) |

(52) U.S. Cl.
CPC ............. *F21S 10/06* (2013.01); *F21S 10/002* (2013.01); *F21V 23/04* (2013.01); *G02B 6/002* (2013.01); *G02B 6/006* (2013.01); *G02B 6/0076* (2013.01); *G02B 6/0091* (2013.01); *F21W 2121/00* (2013.01); *F21Y 2115/10* (2016.08)

(58) Field of Classification Search
CPC ....... B65D 39/00; B65D 81/366; G09F 19/00; G09F 13/00; F21S 10/023; F21S 10/005; F21S 10/002; F21S 10/06; G02B 6/00; G02B 6/0076; G02B 6/006; G02B 6/0036; G02B 6/1886; G02B 6/0091; G02B 6/002; F21Y 2115/10; F21V 23/04; F21W 2121/00
See application file for complete search history.

(56) References Cited

U.S. PATENT DOCUMENTS

| | | | | |
|---|---|---|---|---|
| 4,244,130 A | * | 1/1981 | Frois ................... | G02B 6/0076 40/442 |
| 2003/0147235 A1 | * | 8/2003 | Lin ....................... | F21S 10/002 362/101 |
| 2014/0268866 A1 | * | 9/2014 | Yang ..................... | G09F 19/00 362/605 |
| 2016/0053951 A1 | * | 2/2016 | Wang .................... | F21S 8/035 362/644 |
| 2016/0069523 A1 | * | 3/2016 | Chien ................... | H05B 33/08 362/97.1 |

* cited by examiner

*Primary Examiner* — Anh T Mai
*Assistant Examiner* — Fatima N Farokhrooz
(74) *Attorney, Agent, or Firm* — Leong C. Lei

(57) ABSTRACT

A multilayer flashing water ball apparatus includes a water ball main body, a base and a light transmissive plate module. The water ball main body is light transmissive and includes a platform with an installation slot. The base is secured onto the bottom portion of the water ball main body and includes light emitting elements for emitting light toward the installation slot. The light transmissive plate module includes at least three light transmissive plates inserted into the installation slot. The surfaces of the light transmissive plates include continuous corresponding patterns formed thereon, and such patterns are visually related to each other to form a serious of motion sequence. The bottom portions of the light transmissive plates correspond to the light emitting elements. With the light source of the light emitting elements flashes sequentially, the continuous corresponding patterns inside the water ball main body generate a dynamic visual effect.

8 Claims, 7 Drawing Sheets

MULTILAYER FLASHING WATER BALL APPARATUS

(a) TECHNICAL FIELD OF THE INVENTION

The present invention is related to a water ball ornament, in particular, to a water lamp design used as a visual decoration in an environment and space.

(b) DESCRIPTION OF THE PRIOR ART

Typically, ornaments placed on desktops in our daily lives include photo frames, toys and decoratives, and most of the ornaments are equipped with the appealing outer appearance and static functions only. Accordingly, a water lamp design having sparkling pieces, sparking powders or decoratives contained therein is able to generate a different visual sensation, and it can also utilize the manual shaking and inverted placement or electrical source to allow the internal sparkling pieces, sparking powders or decoratives to generate the visual sensation of liquid flowing. In addition, with different internal content of the water lamp, different visual sensation can be achieved; therefore, it can achieve the effect of space expansion and extension of various and diverse visual effects, or it can be developed to have multiple functions and entertainments. Accordingly, there is a need for a designer to provide a unique water ball design for environment decorative and ornament.

SUMMARY OF THE INVENTION

A primary objective of the present invention is provide a multilayer flashing water ball ornament design in order to increase the product competitiveness.

Accordingly, the present invention provides a multilayer flashing water ball apparatus, comprising:

a water ball main body having a light transmissive three-dimensional shape, and a moving liquid filled at an internal of the water ball main body; the internal of the water ball main body comprising a platform, and the platform having an installation slot;

a base secured onto a lower portion of the water ball main body; an internal of the base comprising a circuit board corresponding to a bottom portion of the water ball main body, a plurality of light emitting elements and a power source module for providing an electricity; the circuit board electrically connected to the power source module; each one of the plurality of light emitting elements electrically connected to the circuit board and arranged spaced apart from each other in sequence to emit light toward the installation slot; and a light transmissive plate module, in a sequential direction from a front to a rear thereof, comprising: a first light transmissive plate, a second light transmissive plate and a third light transmissive plate; wherein surfaces of the first light transmissive plate, the second light transmissive plate and the third light transmissive plate comprise continuous corresponding patterns respectively, and each of the continuous corresponding patterns forms a continuous motion sequence; and wherein a bottom portion of each of the first transmissive plate, the second transmissive plate and the third transmissive plate includes a light guiding portion extended therefrom, each one of the light guiding portions is inserted into the installation slot, and each one of the light guiding portions corresponds to each one of the light emitting elements respectively.

According to the aforementioned structure and configuration, when an observer views the internal of the water ball main body, the first light transmissive plate, the second light transmissive plate and the third light transmissive plate surfaces are able to form continuous corresponding patterns in a continuous motion sequence. With the light emitting elements arranged at the bottom portion thereof, the continuous corresponding patterns are lit up and off sequentially; consequently, the internal of the water ball main body is able to generate a visual effect of a series of motion sequence produced by the continuous corresponding patterns. For example, the series of motion sequence of the continuous corresponding patterns can be the visual sensation of the swimming motions of a dolphin as illustrated in an exemplary embodiment of the present invention.

DETAILED DESCRIPTION OF THE PREFERRED EMBODIMENTS

Figure 1:
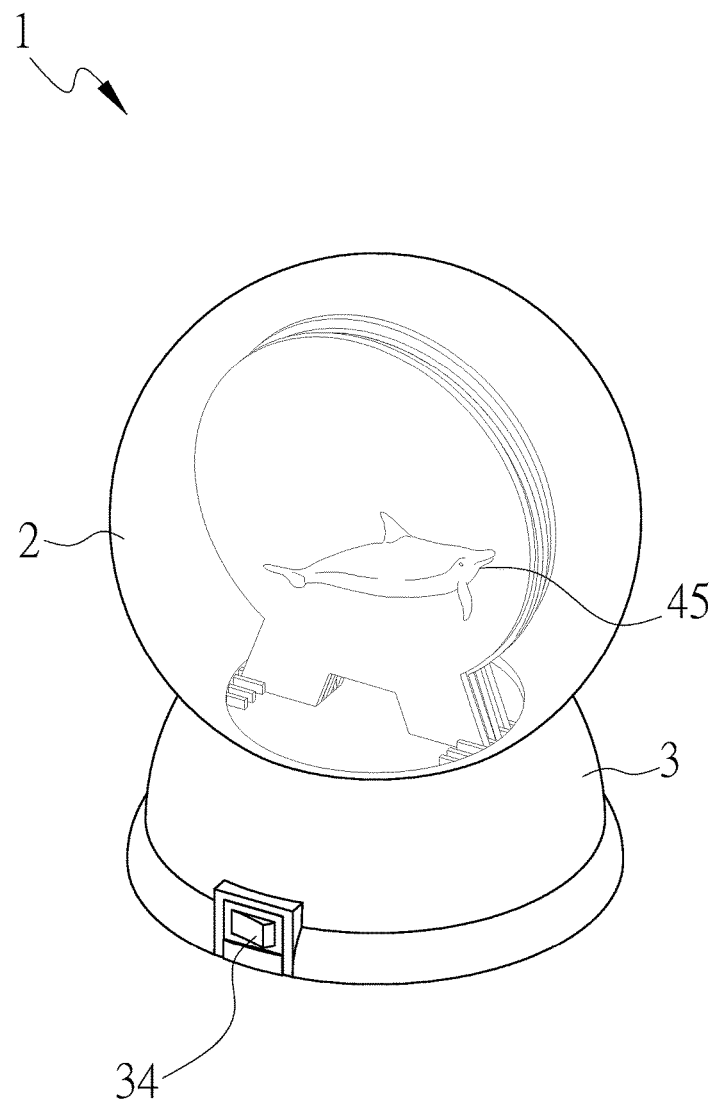
FIG. 1 is a perspective assembly view of the multiplayer flashing water ball apparatus of the present invention.
Figure 2:
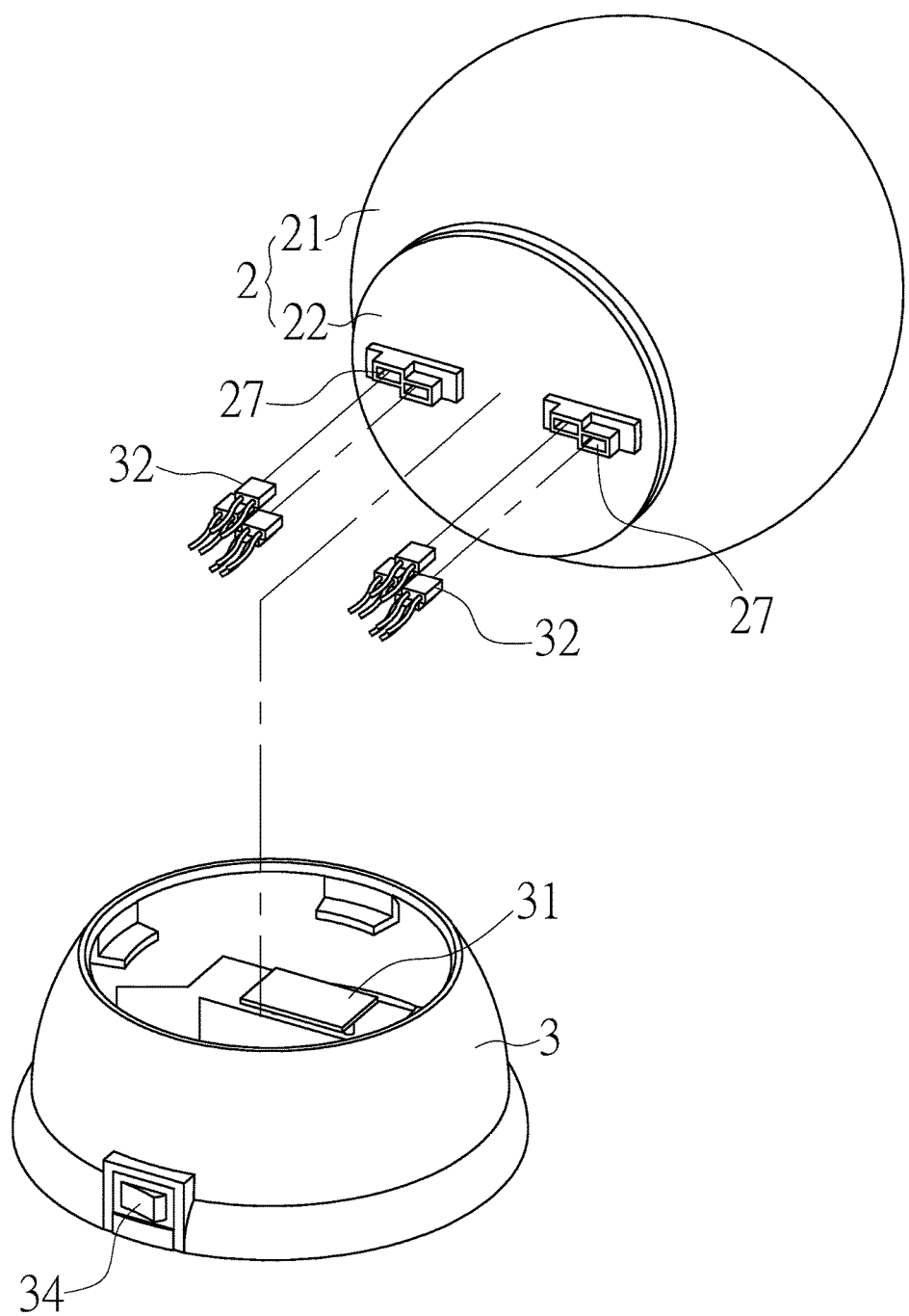
FIG. 2 is a perspective exploded view of the multilayer flashing water ball apparatus of the present invention.
Figure 3:
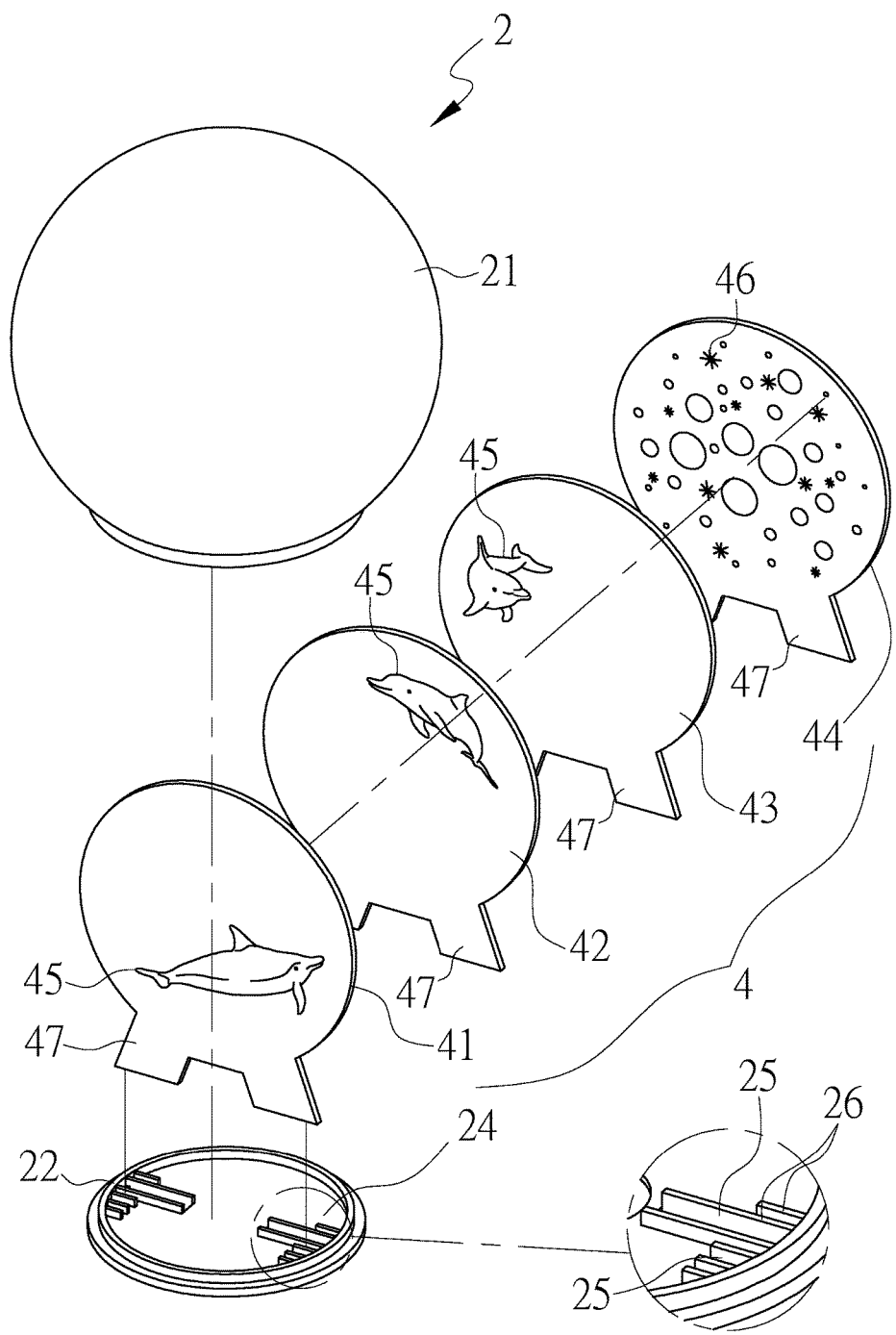
FIG. 3 is an exploded view of the wall ball main body of the multilayer flashing water ball apparatus of the present invention.
Figure 4:
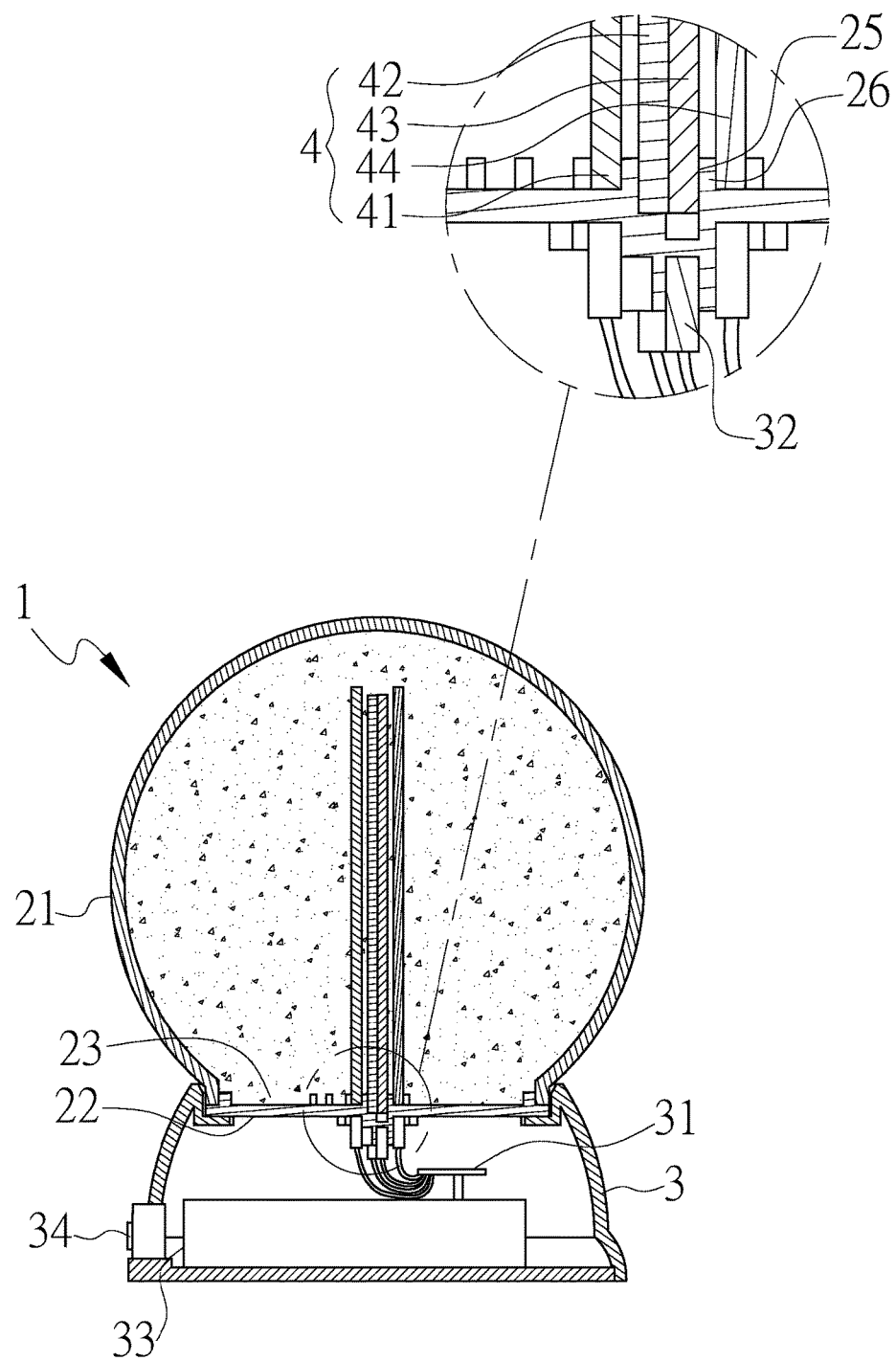
FIG. 4 is a cross sectional view and a partial enlarged view of the multilayer flashing water ball apparatus of the present invention.

Please refer to FIG. 1 to FIG. 4. According to an exemplary embodiment of the present invention, a multilayer flashing water ball apparatus (1) comprises: a water ball main body (2), a base (3) and a light transmissive plate module (4). The base (3) is arranged underneath the water ball main body (2), and the light transmissive plate module (4) is arranged on the base (3) and at the rear of the water ball main body (2).

In addition, the water ball main body (2) includes a light transmissive hollow shell (21) and a light transmissive bottom cover (22). The bottom portion of the shell (21) includes an opening (23), and its internal is filled with moving liquid. The bottom cover (22) is used for sealing the opening (23), and the bottom cover (22) includes a platform (24) extended toward the internal of the shell (21). The platform (24) includes an insertion slot (25). The liquid can be transparent or added with a color dye, or sparkling powders or pieces can be added into the liquid in order to increase its appealing appearance.

Alternatively, color dye can be added during the formation of the water ball main body (2) in order to allow it to have light color while being light transmissive. In this exemplary embodiment, the water ball main body (2) has a ball shape for illustration; however, it shall not be used to limit its appearance. In addition, its material is not limited, and it can be made of light transmissive plastic or glass etc.

The base (3) is secured underneath the water ball main body (2), and it can use the attachment method of screw fastening, bonding or locking etc. The internal of the base (3) includes a circuit board (31), a plurality of light emitting elements (32) and a power source module (33) for providing electricity. In addition, the circuit board (31) is installed at the bottom of the insertion slot (25) and is electrically connected to the power source module (33). Each one of the light emitting elements (32) is electrically connected to the circuit board (31) and arranged spaced apart from each other. In addition, the light emitting elements (32) are controlled by the circuit board (31) to flash sequentially.

Accordingly, the power source module (33) can be a grid plug, battery pack etc. In this exemplary embodiment, the battery pack is used as an example for illustration. Furthermore, the base (3) includes a switch (34) electrically connected to the power source module (33). The switch (34) is mainly used for conducting or disconnecting the power source in order to activate the light emitting elements to be lit up or off indirectly. In this exemplary embodiment, the light emitting elements (32) are LED, and they can be controlled by the circuit board (31) to show a lighting sequence and color change lighting effect.

The light transmissive plate module (4) is inserted into the installation slot (25) of the platform (24), and in a sequential direction from a front to a rear thereof, it comprises: a first light transmissive plate (41), a second light transmissive plate (42), a third light transmissive plate (43) and a backboard (44). The surfaces of the first light transmissive plate (41), the second light transmissive plate (42) and the third light transmissive plate (43) include the continuous corresponding patterns (45) formed thereon respectively. The continuous corresponding patterns (43) form a continuous motion sequence, such as the motion sequence of a swimming dolphin in this exemplary embodiment. The surface of the backboard (44) includes a background pattern (46) formed thereon, and the background pattern (46) mainly cooperates with the continuous corresponding patterns (43) to form a theme background. In this exemplary embodiment, the internal of the installation slot (25) includes a plurality of partitions (26) arranged spaced apart from each other in order to separate the first light transmissive plate (41), the second light transmissive plate (42), the third light transmissive plate (43) and the backboard (44). The quantity of the partition is not limited, and it can be formed in such a way that the first light transmissive plate (41), the second light transmissive plate (42), the third light transmissive plate (43) and the backboard (44) are attached onto each other sequentially at the internal of the installation slot (25) without any separation. Alternatively, its structure can also be configured in such a way that the first light transmissive plate (41) is separated from the backboard (44), and the second light transmissive plate (42) and the third light transmissive plate 943) are not separated from each other.

In addition, the bottom portions of the first light transmissive plate (41), the second light transmissive plate (42), the third light transmissive plate (43) and the backboard (44) further include a light guiding portion (47) extended therefrom respectively in order to insert each one of the light guiding portions (47) into the installation slot (32). Each one of the light guiding portions (47) corresponds to a light emitting element (34) or a plurality of light emitting elements. In this exemplary embodiment, each of the light guiding portions (47) is of a U shape; therefore it corresponds to two light emitting elements (32). The bottom portion of the bottom cover (22) includes a plurality of light slots (27). Each one of the light emitting elements (32) is installed inside the light slots (27) respectively. Alternatively, a portion of light emitting elements (32) can be installed at the light slots (27) and another portion thereof are installed outside of the light slots (27); in addition, they can contact with the bottom cover (22) to circumference the light slots (27) in order to increase the light concentration of the light source (L).

Figure 5:
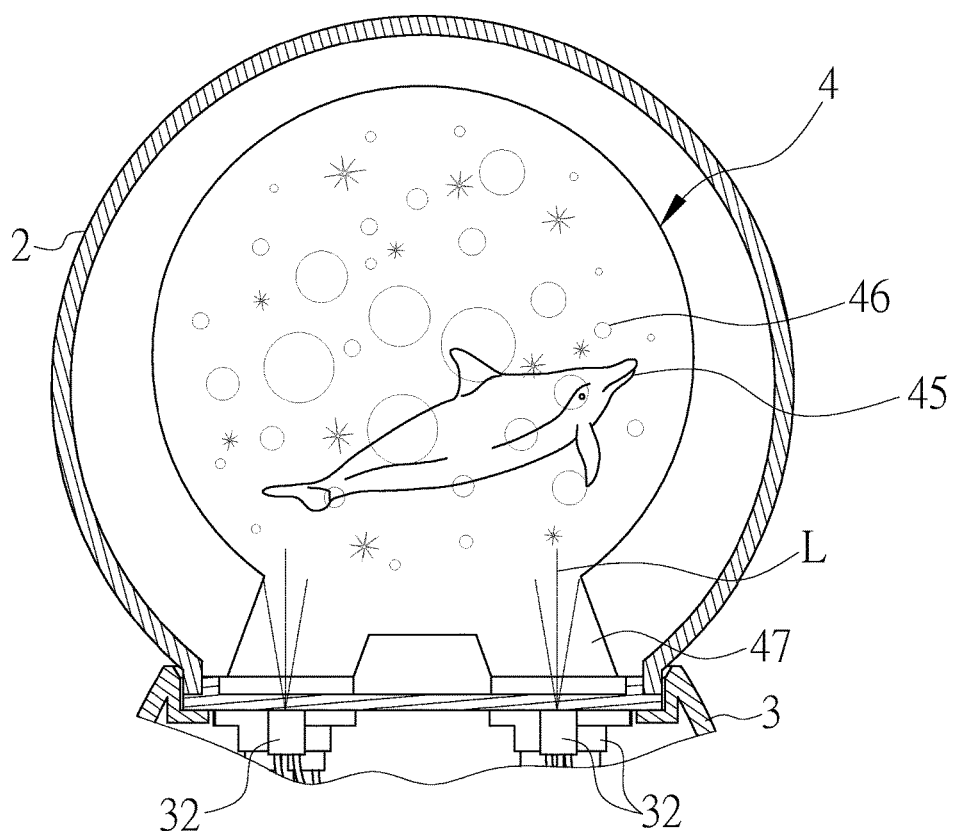
FIG. 5 shows a continuous flashing state of the multilayer flashing water ball apparatus of the present invention.
Figure 6:
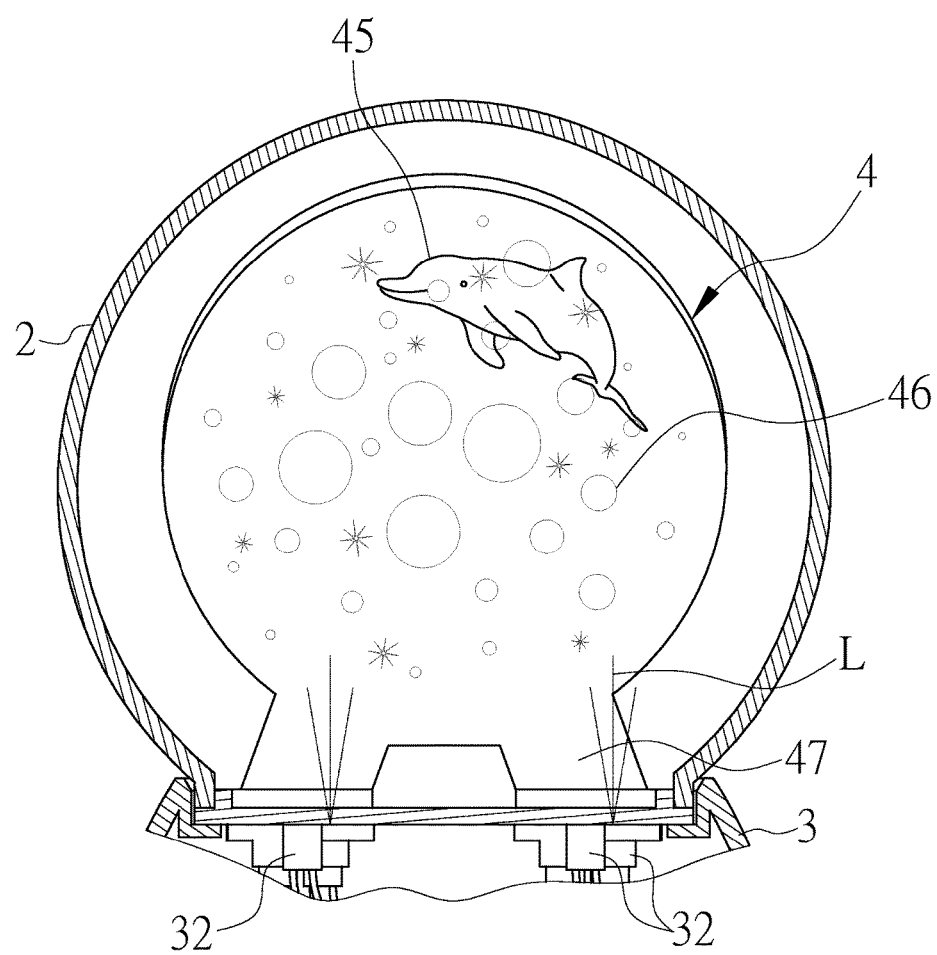
FIG. 6 shows another continuous flashing state of the multilayer flashing water ball apparatus of the present invention.
Figure 7:
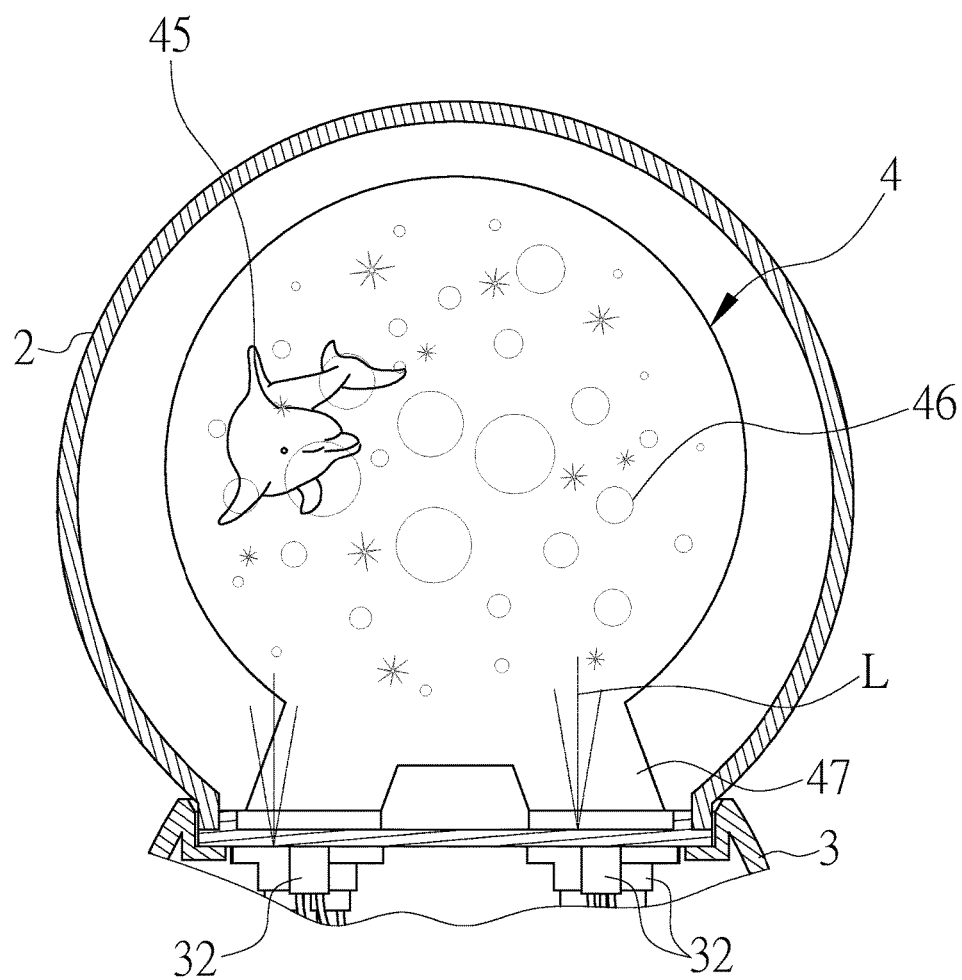
FIG. 7 shows still another continuous flashing state of the multilayer flashing water ball apparatus of the present invention.

As shown in FIG. 5 to FIG. 7, when the switch (34) is turned on to the electrical conductive state, the circuit board (31) is able to control the light emitting elements (32) to be lit up and off sequentially. The light guiding portions (47) can guide the light source (L) to shine toward the internal of the first light transmissive plate (32), the second light transmissive plate (42) and the third light transmissive plate (43) in order to allow the continuous corresponding patterns (45) to be lit up sequentially. Furthermore, the backboard (44) is opaque and its main purpose is to block the light source (L) for scattering outward; in addition, its light guiding portion (47) at the lower portion thereof can include a light emitting element (32) in order to increase the illuminating effect of the background pattern (46). The present invention is not limited to any type or form of the continuous corresponding patterns (45), which can be engraved or patterns with fluorescent paints etc. Since the traveling path of the light source (L) of the light emitting elements (32) is in a direct projection manner, the edges of the continuous corresponding patterns (45) can also show glowing light.

When an observer views the internal of the water ball main body (2), he or she is able to see the continuous corresponding patterns (45) being continuously lit up and flashed sequentially; therefore, the visual effect of a series of motion sequence among the patterns can be perceived. In this exemplary embodiment, patterns of a swimming dolphin can be observed, and the series of motion sequence can show the dynamic patterns of a lively swimming dolphin. Consequently, the flashing and dynamic visual sensation of the present invention can be achieved in order to increase the product competitiveness.

I claim:

1. A multilayer flashing water ball apparatus, comprising:
a water ball main body having a light transmissive three-dimensional shape, and a moving liquid filled at an internal of the water ball main body; the internal of the water ball main body comprising a platform, and the platform having an installation slot;
a base secured onto a lower portion of the water ball main body; an internal of the base comprising a circuit board corresponding to a bottom portion of the water ball main body, a plurality of light emitting elements and a power source module for providing an electricity; the circuit board electrically connected to the power source module; each one of the plurality of light emitting elements electrically connected to the circuit board and arranged spaced apart from each other in sequence to emit light toward the installation slot; and
a light transmissive plate module, in a sequential direction from a front to a rear thereof, sequentially comprising: a first light transmissive plate, a second light transmissive plate and a third light transmissive plate; wherein surfaces of the first light transmissive plate, the second light transmissive plate and the third light transmissive plate comprise continuous corresponding patterns respectively, and each of the continuous corresponding patterns forms a continuous motion sequence; and wherein a bottom portion of each of the first transmissive plate, the second transmissive plate and the third transmissive plate includes a light guiding portion extended therefrom, each one of the light guiding portions is inserted into the installation slot, and each one of the light guiding portions corresponds to each one of the light emitting elements respectively;

wherein a backboard is arranged at one side of the third light transmissive plate and comprises at least a part that is opaque to light.

2. The multilayer flashing water ball apparatus according to claim 1, wherein the backboard is inserted into the installation slot and includes a surface formed with a background pattern.

3. The multilayer flashing water ball apparatus according to claim 1, wherein the first light transmissive plate, the second light transmissive plate and the third light transmissive plate are attached to each other sequentially.

4. The multilayer flashing water ball apparatus according to claim 1, wherein the installation slot includes a plurality of partitions arranged spaced apart therein in order to separate the light transmissive plate module.

5. The multilayer flashing water ball apparatus according to claim 1, wherein a bottom portion of the water ball main body includes a plurality of light slots, and each one of the light emitting elements are inserted into the light slots respectively.

6. The multilayer flashing water ball apparatus according to claim 1, wherein the water ball main body comprises a light transmissive shell and a light transmissive bottom cover, and the platform is arranged on the bottom cover.

7. The multilayer flashing water ball apparatus according to claim 1, wherein the base includes a switch electrically connected to the power source module.

8. The multilayer flashing water ball apparatus according to claim 1, wherein each one of the light emitting elements is a LED.

* * * * *